(12) United States Patent
Otake

(10) Patent No.: US 12,014,156 B2
(45) Date of Patent: Jun. 18, 2024

(54) PROGRAM CREATION SUPPORT PROGRAM TO PROVIDE LOG DATA ON DEVICE VALUES AND DEPENDENCY RELATIONSHIPS BETWEEN DEVICES

(71) Applicant: Mitsubishi Electric Corporation, Tokyo (JP)

(72) Inventor: Yuya Otake, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 88 days.

(21) Appl. No.: 17/912,522

(22) PCT Filed: Sep. 4, 2020

(86) PCT No.: PCT/JP2020/033606
§ 371 (c)(1),
(2) Date: Sep. 19, 2022

(87) PCT Pub. No.: WO2022/049724
PCT Pub. Date: Mar. 10, 2022

(65) Prior Publication Data
US 2023/0129280 A1    Apr. 27, 2023

(51) Int. Cl.
*G06F 8/34* (2018.01)
(52) U.S. Cl.
CPC .................................... *G06F 8/34* (2013.01)
(58) Field of Classification Search
None
See application file for complete search history.

(56) References Cited

U.S. PATENT DOCUMENTS

2012/0192008 A1*  7/2012  Suzuki ............... G06F 11/079
                                               714/15
2014/0089744 A1*  3/2014  Oshiro ............... G06F 17/40
                                               714/48
(Continued)

FOREIGN PATENT DOCUMENTS

CN     107615191 A    1/2018
JP     2007-86831 A   4/2007
(Continued)

OTHER PUBLICATIONS

Office Action issued Jun. 28, 2023 in Chinese Patent Application No. 202080099420.3, 14 pages.
(Continued)

*Primary Examiner* — Qing Chen
(74) *Attorney, Agent, or Firm* — XSENSUS LLP

(57) ABSTRACT

A program creation support program to display devices that store data indicating the operating status of a control system and associated device values, based on a control program executed by a control apparatus, causes a computer to perform a dependency relationship extraction step of extracting the dependency relationships between the devices described in the control program, a log data input step of acquiring, as log data information, log data collected by the control apparatus during the operation of the control system, based on recording setting information describing a condition for collecting the log data information, a display information generation step of generating display information that visualizes the dependency relationships and visualizes the device values associated with the devices, based on the dependency relationships and the log data information, and a generation result output step of displaying the display information.

14 Claims, 14 Drawing Sheets

(56) References Cited

U.S. PATENT DOCUMENTS

| | | | |
|---|---|---|---|
| 2016/0033953 A1 | 2/2016 | Nakagawa | |
| 2017/0153960 A1* | 6/2017 | Tsunoda | G06F 11/3072 |
| 2017/0223040 A1* | 8/2017 | Ikuse | H04L 63/1408 |
| 2020/0228412 A1* | 7/2020 | Abu Asba | H04L 43/0876 |
| 2023/0128016 A1* | 4/2023 | Sakuma | G06F 11/366 |
| | | | 714/38.1 |

FOREIGN PATENT DOCUMENTS

| | | |
|---|---|---|
| JP | 2013-225251 A | 10/2013 |
| JP | 6664562 B1 | 3/2020 |
| JP | 2020-67751 A | 4/2020 |
| WO | 2014/167726 A1 | 10/2014 |
| WO | 2016/194099 A1 | 12/2016 |

OTHER PUBLICATIONS

International Search Report and Written Opinion mailed on Nov. 24, 2020, received for PCT Application PCT/JP2020/033606, filed on Sep. 4, 2020, 9 pages including English Translation.
Decision to Grant mailed on Feb. 16, 2021, received for JP Application 2021-501348, 5 pages including English Translation.
Chinese Office Action issued Feb. 4, 2023, in corresponding Chinese Patent Application No. 202080099420.3, 14pp.
Office Action issued Feb. 1, 2024 in Chinese Patent Application No. 202080099420.3, 14 pages.

\* cited by examiner

PROGRAM CREATION SUPPORT PROGRAM TO PROVIDE LOG DATA ON DEVICE VALUES AND DEPENDENCY RELATIONSHIPS BETWEEN DEVICES

CROSS-REFERENCE TO RELATED APPLICATION

The present application is based on PCT filing PCT/JP2020/033606, filed Sep. 4, 2020, the entire contents of which are incorporated herein by reference.

FIELD

The present disclosure relates to a program creation support program, a program creation support apparatus, and a program creation support method for supporting the creation of a program.

BACKGROUND

A control apparatus that controls a control target apparatus such as a robot, uses a control program to control the control target apparatus. There is a technique to visualize the relationship between a control algorithm defined in the control program and the state of the control target apparatus in an easy-to-understand format.

An information processing apparatus described in Patent Literature 1 analyzes the dependency relationships between devices described in a control program and visualizes the relationships on a graph. The devices are areas to store pieces of data that are input to and output from a control apparatus and a control target apparatus. The information processing apparatus described in Patent Literature 1 acquires device values that are data indicating the state of the control target apparatus from the control apparatus executing the control program, and displays the device values on the graph on which the dependency relationships between the devices are visualized.

CITATION LIST

Patent Literature

Patent Literature 1: Japanese Patent Application Laid-open No. 2013-225251

SUMMARY

Technical Problem

In the technique of Patent Literature 1, the control apparatus can acquire real-time device values by online monitoring that is monitoring processing on device values while real-time data is transmitted from the control target apparatus to the information processing apparatus. However, the technique of Patent Literature 1 does not describe a method of collecting log data on device values and cannot acquire log data on device values, and thus has a problem of being unable to display log data on device values.

The present disclosure has been made in view of the above. It is an object of the present disclosure to provide a program creation support program capable of providing log data on device values together with information that visualizes the dependency relationships between devices.

Solution to Problem

To solve the above problem and achieve an object, the present disclosure is directed to a program creation support program to display devices that are areas to store data indicating an operating status of a control system, and associated device values that are values held by the devices, based on a control program executed by a control apparatus of the control system, the control system including a control target apparatus and the control apparatus that controls the control target apparatus, the program creation support program causing a computer to perform: a dependency relationship extraction step of extracting dependency relationships between the devices described in the control program, the dependency relationships being relationships between the devices in which one device affects another device. Furthermore, the program creation support program according to the present disclosure causes the computer to perform a log data input step of acquiring, as log data information that is information on log data on the device values, log data collected by the control apparatus during operation of the control system, based on recording setting information describing a condition for collecting the log data information; a first display information generation step of generating first display information that visualizes the dependency relationships and visualizes the device values associated with the devices, based on the dependency relationships and the log data information; and a first generation result output step of displaying the first display information.

Advantageous Effects of Invention

The program creation support program according to the present disclosure has an effect of being able to provide log data on device values together with information that visualizes the dependency relationships between devices.

DESCRIPTION OF EMBODIMENTS

Hereinafter, a program creation support program, a program creation support apparatus, and a program creation support method according to an embodiment of the present disclosure will be described in detail with reference to the drawings.

Embodiment

Figure 1:
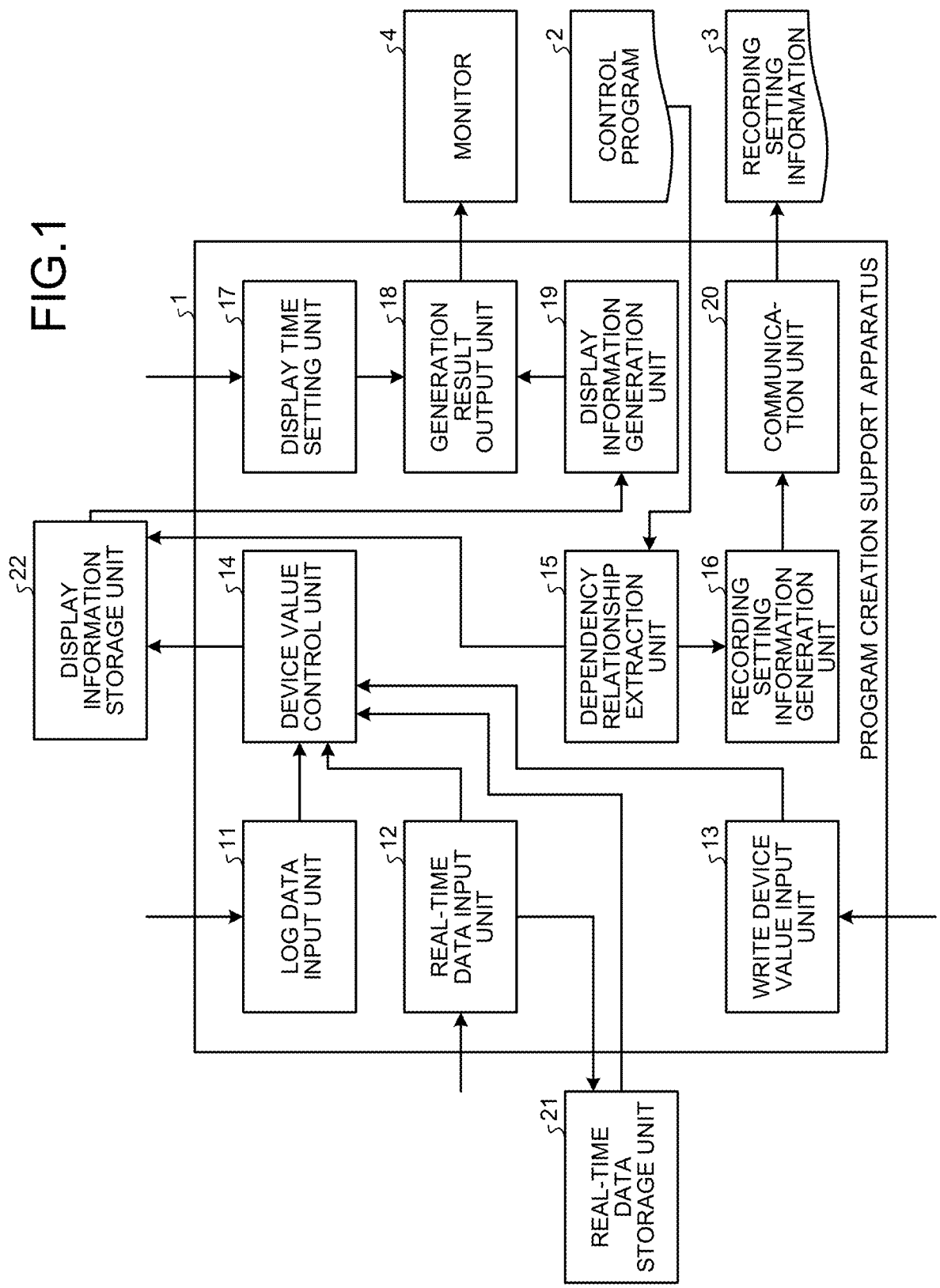
FIG. 1 is a diagram illustrating a configuration of a program creation support apparatus according to an embodiment.

FIG. 1 is a diagram illustrating a configuration of a program creation support apparatus according to the embodiment. The program creation support apparatus 1 is a computer that executes an engineering tool, a program. The engineering tool is a program creation support program to support the creation of a control program 2 used by a control apparatus that controls a control target apparatus such as a robot when controlling the control target apparatus. The control apparatus is, for example, a programmable logic controller (PLC).

The control program 2 is, for example, a ladder program created in ladder language or a structured text program created in structured text (ST) language. In the control program 2, devices, the dependency relationships between the devices, and parameters for operating a processor such as a central processing unit (CPU) included in the control apparatus are described. The dependency relationships between the devices are relationships in which one device affects another device. The one device may be one of a plurality of devices that affects another device. The another device may be one of a plurality of devices that is affected by one device. For example, a ladder program, which is a sequence program, is described mainly using variables, devices, and numerical values. The devices are areas to store pieces of data that are input to and output from the control apparatus that executes the control program 2 and the control target apparatus. In other words, the devices are the memory addresses of blocks in which device values are stored.

To collect device values during the execution of the control program 2 as log data, the program creation support apparatus 1 needs to set devices that become targets of collection in advance. In the embodiment, the program creation support apparatus 1 extracts the dependency relationships between devices described in the control program 2, and sets devices that become targets of log data collection, based on the extraction results, thereby reducing the engineering man-hours of a user.

The program creation support apparatus 1 creates recording setting information 3 to be described later in which the devices that become targets of log data collection are set, and sends the recording setting information 3 to the control apparatus to request log data from the control apparatus. The processor of the control apparatus collects the log data according to the recording setting information 3 and sends the log data to the program creation support apparatus 1. Thus, the program creation support apparatus 1 acquires the log data corresponding to the recording setting information 3 from the control apparatus. In the log data, the devices are associated with the device values.

The program creation support apparatus 1 performs offline monitoring by displaying the device values acquired as the log data on a graph, which visualizes the correspondence relationships between the device values and the devices and the dependency relationships between the devices. That is, the program creation support apparatus 1 performs offline monitoring by displaying display information that visualizes the dependency relationships between the devices, and visualizes the device values that are the log data corresponding to the devices.

The program creation support apparatus 1 performs online monitoring by displaying device values acquired as real-time data to be described later on a graph, which visualizes the correspondence relationships between the device values and devices and the dependency relationships between the devices. That is, the program creation support apparatus 1 performs online monitoring by displaying display information that visualizes the dependency relationships between the devices and visualizes the device values that are the real-time data corresponding to the devices. Details of devices and device values that are values stored in the devices will be described later. Online monitoring will also be described later.

The program creation support apparatus 1 visualizes the relationship between a control algorithm defined in the control program 2 and the state of the control target apparatus in an easy-to-understand format. Specifically, the program creation support apparatus 1 analyzes the dependency relationships between devices described in the control program 2, and visualizes the control program 2 on a graph, based on the dependency relationships.

A storage unit included in the control apparatus includes device memory that stores control information that is information on the control target apparatus. The device memory is memory that holds various device values whose values are updated when the control apparatus executes the control program 2, according to the items of the execution. The storage area of the memory is divided into a plurality of areas called devices.

The devices are assigned to addresses of the device memory included in the control apparatus. The device assignment is performed according to the control program 2. When the control apparatus is a PLC, device characters are determined in advance according to data types such that an X device is assigned to input, a Y device is assigned to output, an M device is assigned to bit-type data used internally, and a D device is assigned to word-type data. Each device is represented by a device character and an address. An input device of address 0 is represented as "X0". Thus, a device is a name that defines an area in the device memory that is an area of shared memory included in the control apparatus.

Device values are data indicating the values of the control information that is used by the control apparatus when controlling the control target apparatus, and are data indicating the operating status of a control system that includes the control apparatus and the control target apparatus. The device values are also referred to as device state information. The device values are information that is updated as appropriate while the control program 2 is being executed by the control apparatus. The values change in accordance with the operating status of the control program 2, that is, the operating status of the control system. The user can know the operating status of the control program 2 by checking the device values.

The program creation support apparatus 1 searches the control program 2 for a device having a dependency relationship with a device specified by the user in the control program 2. The device having a dependency relationship with the device specified by the user is a device that is affected by the device specified by the user. The device specified by the user and a device having a direct or indirect dependency relationship with the device are devices that become targets of log data extraction. Hereinafter, devices that become targets of log data extraction are referred to as devices to be extracted. The program creation support apparatus 1 sets devices to be extracted in the recording setting information 3.

The recording setting information 3 is information used by the control apparatus when the program creation support apparatus 1 acquires device values from the control apparatus. The recording setting information 3 includes information for identifying devices that are targets for collection, a device value collection cycle, collection timing, etc. The information for identifying devices that are targets for collection may be the names of the devices or the identification numbers of the devices.

The control apparatus starts collecting device values from the control target apparatus or the like at a specific timing, and stores the collected device values as log data. Log data is time-series data indicating the values of the control information used by the control apparatus for controlling the control target apparatus. The control apparatus may start collecting log data when, for example, the control apparatus starts operating, or may start collecting log data when a specific device is turned on.

The program creation support apparatus 1 acquires log data on device values of the control target apparatus from the control apparatus by transmitting the recording setting information 3 to the control apparatus. At this time, the control apparatus transmits log data collected based on the recording setting information 3, to the program creation support apparatus 1.

Thus, for the device value of a device specified by the user, the program creation support apparatus 1 acquires, offline, log data on the device value that has been stored by the control apparatus, and displays the device value. Further, the program creation support apparatus 1 can acquire, online, the device value of a device specified by the user from the control apparatus, and displays the device value.

The following describes components included in the program creation support apparatus 1. The program creation support apparatus 1 includes a log data input unit 11, a real-time data input unit 12, a write device value input unit 13, and a device value control unit 14. In addition, the program creation support apparatus 1 includes a dependency relationship extraction unit 15, a recording setting information generation unit 16, a display time setting unit 17, a generation result output unit 18, a display information generation unit 19, and a communication unit 20.

The program creation support apparatus 1 is connected to a real-time data storage unit 21, a display information storage unit 22, the control apparatus, and a monitor 4. The monitor 4 being a display device, is, for example, a liquid crystal monitor.

When an instruction for offline monitoring is given from the user, the log data input unit 11 accepts log data corresponding to the recording setting information 3 from the control apparatus. The offline monitoring is monitoring processing on device values while real-time data is not transmitted from the control apparatus to the program creation support apparatus 1.

Device values, which the log data input unit 11 acquired from the control apparatus, are associated with time after the start of the execution of the control program 2. That is, the log data input unit 11 acquires, from the control apparatus, information on the log data having device values associated with time, as log data information. The time is points of time after the start of the execution of the control program. In other words, the time is time elapsed since the start of the execution of the control program 2.

The log data information includes the device values at different points of time. In other words, the log data information includes information on the development of the changing log data. The log data input unit 11 inputs the accepted log data information to the device value control unit 14.

When an instruction for online monitoring is given from the user, the real-time data input unit 12 accepts real-time data from the control apparatus. The real-time data accepted by the real-time data input unit 12 is real-time device values. In the real-time data, devices are associated with the device values. The online monitoring is monitoring processing on the device values while real-time data is transmitted from the control apparatus to the program creation support apparatus 1. The real-time data input unit 12 inputs the accepted real-time data to the device value control unit 14. In addition, the real-time data input unit 12 stores the accepted real-time data in the real-time data storage unit 21. The real-time data storage unit 21 is a memory or the like that stores real-time data.

The write device value input unit 13 accepts a user input value that is a device value input from the user. The device value accepted by the write device value input unit 13 is a device value that can be written to the control system. When the device value is written to a device, the device value of a device having a dependency relationship with the device to which the device value has been written also changes. When the device value input from the user is written to the device, the program creation support apparatus 1 displays how the device value of each device changes on the monitor 4.

When an instruction for generating the recording setting information 3 is given from the user, the dependency relationship extraction unit 15 searches the control program 2 for a device having a dependency relationship with a device to be extracted specified by the user, and adds the device found to the device to be extracted.

Likewise, when an instruction for offline monitoring or online monitoring is given from the user, the dependency relationship extraction unit 15 searches the control program 2 for a device having a dependency relationship with a device to be extracted specified by the user, and adds the device found to the device to be extracted. When offline monitoring or online monitoring is performed, the dependency relationship extraction unit 15 stores devices to be extracted and dependency relationships in the display information storage unit 22.

When generating the recording setting information 3, the recording setting information generation unit 16 sets devices to be extracted set by the dependency relationship extraction unit 15 in the recording setting information 3. The recording setting information generation unit 16 may set a collection cycle and collection timing for a device value specified from the user in the recording setting information 3, or may set a default collection cycle and collection timing in the recording setting information 3.

The device value control unit 14 acquires log data information including device values from the log data input unit 11, the real-time data input unit 12, the real-time data storage unit 21, or the write device value input unit 13, and stores the log data information in the display information storage unit 22.

The display information storage unit 22 is a memory or the like for storing log data information, devices to be extracted, and dependency relationships.

Based on log data information, devices to be extracted, and dependency relationships stored in the display information storage unit 22, the display information generation unit 19 generates display information including information that visualizes the dependency relationships between the devices and device values associated with the corresponding devices. The display information generation unit 19 sends the display information to the generation result output unit 18. In the embodiment, display information generated by offline monitoring is first display information, and display information generated by online monitoring is second display information.

The display time setting unit 17 accepts time input to the program creation support apparatus 1 by the user. The user may input the time log data at which the user wants to view, to a control unit controlling the monitor 4. In this case, for example, the user specifies the time log data at which the user wants to view, on a screen displayed by the monitor 4. This causes the control unit controlling the monitor 4 to notify the display time setting unit 17 of the time specified by the user. The display time setting unit 17 sends the time specified by the user to the generation result output unit 18.

The generation result output unit 18 outputs display information to the monitor 4 to be displayed. The generation result output unit 18 first displays, on the monitor 4, device values at the earliest time among the time points included in the display information.

The device values of the corresponding devices displayed by the monitor 4 change with the progress of time, that is, with elapsed time. When accepting time from the display time setting unit 17, the generation result output unit 18 displays device values associated with the time on the monitor 4. As described above, in display information displayed by the monitor 4, time is associated with device values, and the program creation support apparatus 1 can display device values associated with the time specified by the user on the monitor 4.

Figure 2:
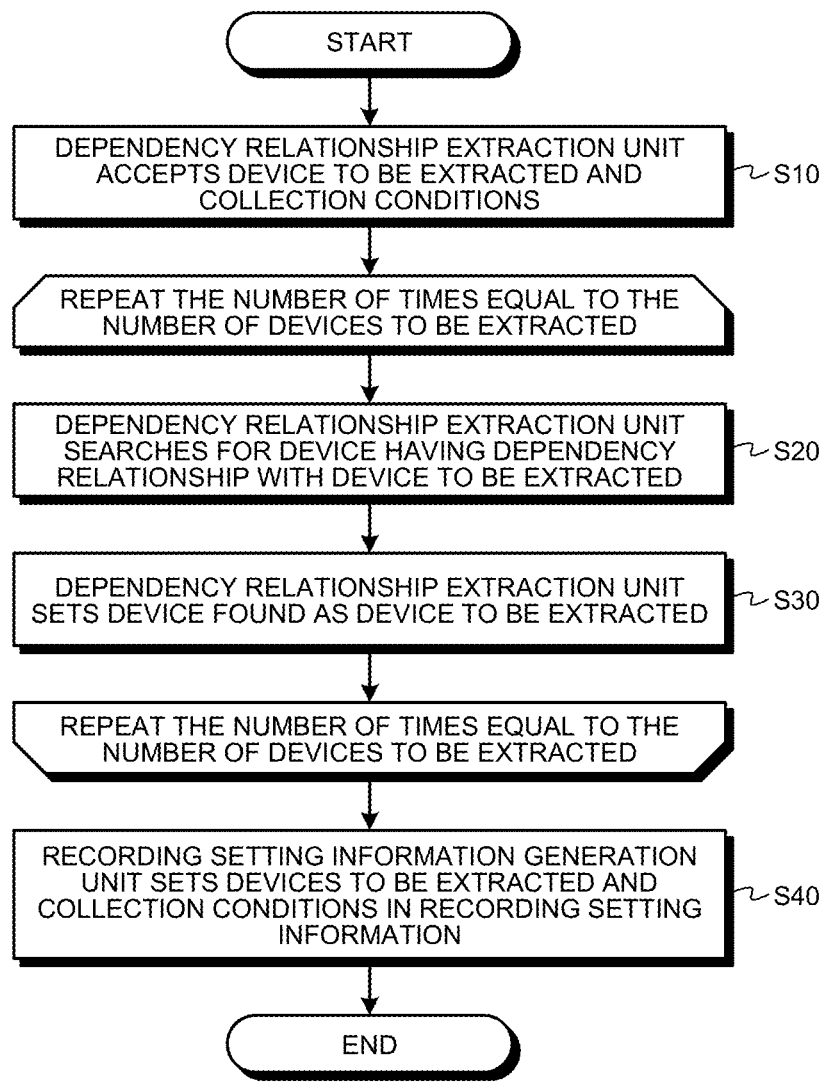
FIG. 2 is a flowchart illustrating a procedure to generate recording setting information, performed by the program creation support apparatus according to the embodiment.

FIG. 2 is a flowchart illustrating a procedure to generate the recording setting information, performed by the program creation support apparatus according to the embodiment. The dependency relationship extraction unit 15 of the program creation support apparatus 1 accepts a device to be extracted, which is a target of dependency relationship extraction, and a log data collection condition from the user (step S10). Here, the device to be extracted is a device corresponding to log data that the user wants to acquire, and is specified by the user.

The log data collection condition is a condition under which the control apparatus collects log data. In the log data collection condition, for example, it is prescribed that the control apparatus collects log data in a specific collection cycle such as every second, that the control apparatus collects the changed device value when the device value of a specific device changes, or the like. Further, in the log data collection condition, it may be prescribed that the control apparatus collects log data after a specific device is turned on. The collection condition may include a log data collection period. The log data collection period is a period during which the control apparatus collects log data, and is a specific period during the execution of the control program 2.

Then, the dependency relationship extraction unit 15 repeats processing in steps S20 and S30 the number of times equal to the number of devices to be extracted.

That is, the dependency relationship extraction unit 15 searches the devices included in the control program 2 for a device having a dependency relationship with the device to be extracted that has already been set (step S20). The dependency relationship extraction unit 15 sets the device found as a device to be extracted (step S30). Thus, the number of devices to be extracted increases.

The dependency relationship extraction unit 15 repeats the processing in steps S20 and S30 on a device to be extracted specified by the user and a device to be extracted set in step S30.

When the dependency relationship extraction unit 15 sets all devices to be extracted, the recording setting information generation unit 16 sets the devices to be extracted and the collection condition in the recording setting information 3 (step S40). Thus, the program creation support apparatus 1 generates the recording setting information 3 in which the devices to be extracted that become targets of log data collection are described, based on the dependency relationships between the devices.

Upon starting preparations for offline monitoring, the program creation support apparatus 1 generates the recording setting information 3 according to the procedure in FIG. 2 described above. The recording setting information generation unit 16 sends the recording setting information 3 to the communication unit 20. The communication unit 20 transmits the recording setting information 3 to the control apparatus. The control apparatus stores log data based on the recording setting information 3. The control apparatus generates log data information using the log data corresponding to the recording setting information 3. The log data corresponding to the recording setting information 3 is the device values of devices to be extracted that satisfy the collection condition.

The control apparatus transmits the generated log data information to the log data input unit 11. Thus, the log data input unit 11 accepts the log data information and sends the log data information to the device value control unit 14. The device value control unit 14 stores the log data information in the display information storage unit 22. Then, the program creation support apparatus 1 starts offline monitoring using the log data information. Hereinafter, a detailed procedure for offline monitoring performed by the program creation support apparatus 1 will be described.

Figure 3:
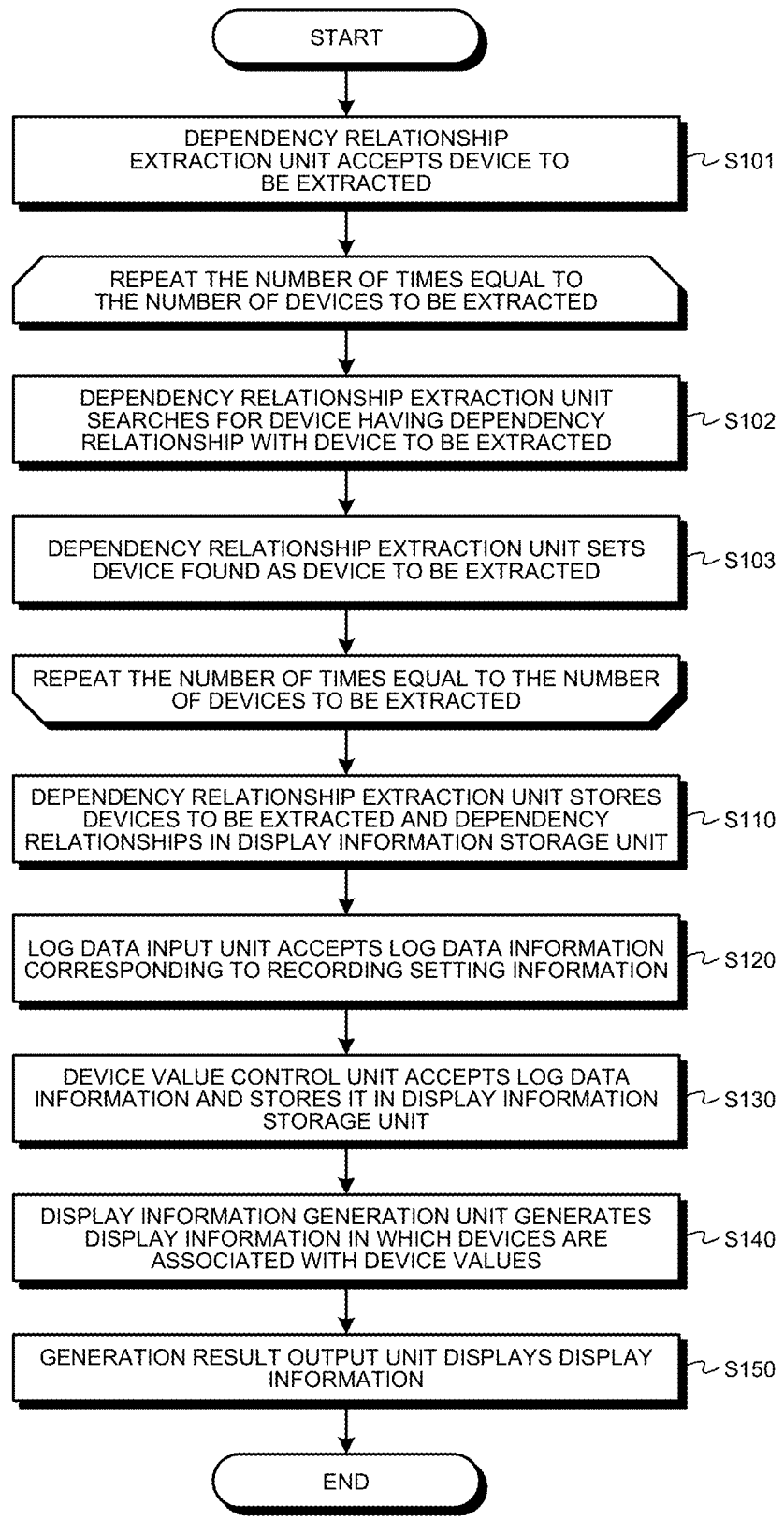
FIG. 3 is a flowchart illustrating a procedure for offline monitoring performed by the program creation support apparatus according to the embodiment.

FIG. 3 is a flowchart illustrating a procedure for offline monitoring performed by the program creation support apparatus according to the embodiment. The dependency relationship extraction unit 15 of the program creation support apparatus 1 accepts a device to be extracted, which is a target of dependency relationship extraction, from the user (step S101). Here, the device to be extracted is a device corresponding to log data that the user wants to display by offline monitoring.

Then, the dependency relationship extraction unit 15 repeats processing in steps S102 and S103 the number of times equal to the number of devices to be extracted, as is the case with the processing in steps S20 and S30 described in FIG. 2.

That is, the dependency relationship extraction unit 15 searches the devices included in the control program 2 for a device having a dependency relationship with the device to be extracted that has already been set (step S102). The dependency relationship extraction unit 15 sets the device found as a device to be extracted (step S103). Thus, the number of devices to be extracted increases.

The dependency relationship extraction unit 15 repeats the processing in steps S102 and S103 on a device to be extracted specified by the user and a device to be extracted set in step S103.

After setting all devices to be extracted, the dependency relationship extraction unit 15 stores the devices to be extracted and the dependency relationships in the display information storage unit 22 (step S110).

The log data input unit 11 accepts, from the control apparatus, log data information generated by the control apparatus based on the recording setting information 3. That is, the log data input unit 11 accepts log data information corresponding to the recording setting information 3 from the control apparatus (step S120). The log data input unit 11 inputs the log data information to the device value control unit 14.

The device value control unit 14 accepts the log data information sent from the log data input unit 11 and stores the log data information in the display information storage unit 22 (step S130). The device value control unit 14 may read the log data information from the log data input unit 11.

On the basis of the devices to be extracted, the dependency relationships, and the log data information in the display information storage unit 22, the display information generation unit 19 generates display information in which the devices are associated with the device values (step S140). The display information includes information that visualizes the dependency relationships between the devices.

The generation result output unit 18 displays the display information generated by the display information generation unit 19 on the monitor 4 (step S150). The processing in steps S120 and S130 described above may be executed at any timing before the processing in step S140.

When the program creation support apparatus 1 displays the state of device values associated with time different from the time currently displayed during offline monitoring, the display information generation unit 19 generates display information again based on the time set in the display time setting unit 17. For example, when the user specifies time that is earlier than the time included in generated display information to the display time setting unit 17, the display information generation unit 19 newly reads log data information at the time specified by the user from the display information storage unit 22, and generates display information again.

When the program creation support apparatus 1 performs offline monitoring, the control apparatus may collect log data information based on the recording setting information 3 that is manually created by the user. In this case, the log data input unit 11 accepts, from the control apparatus, the log data information collected by the control apparatus based on the recording setting information 3 manually created.

Figure 4:
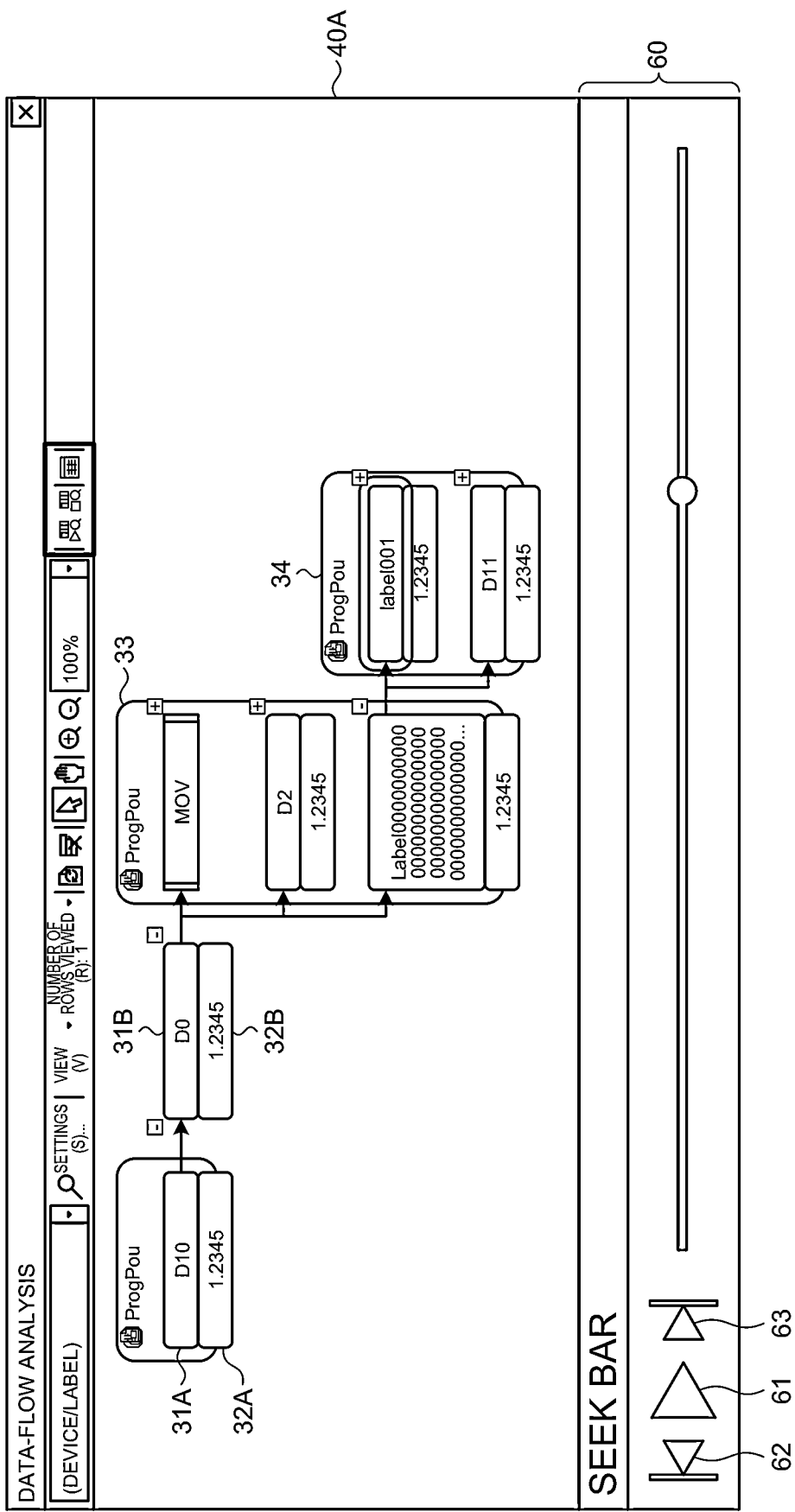
FIG. 4 is a diagram illustrating an example of display information displayed on a monitor by the program creation support apparatus according to the embodiment.

Here, a graph that visualizes the dependency relationships between devices will be described. FIG. 4 is a diagram illustrating an example of display information displayed on the monitor by the program creation support apparatus according to the embodiment. Display information is displayed on the monitor 4 as, for example, a graph 40A illustrated in FIG. 4.

The graph 40A illustrated in FIG. 4 includes blocks 31A and 31B and program components 33 and 34. The program component 34 is dependent on the program component 33, the program component 33 is dependent on the block 31B, and the block 31B is dependent on the block 31A.

The block 31A is a block showing a device D10, and the block 31B is a block showing a device D0. In the example illustrated in FIG. 4, a block showing a device value is displayed near a block showing a device.

For example, a block 32A of a device value corresponding to the block 31A of the device D10 is displayed near the block 31A showing the device D10. A block 32B of a device value corresponding to the block 31B of the device D0 is displayed near the block 31B showing the device D0.

The program component 33 includes a function block of transfer command MOV, a block showing a device D2, and a block showing a label. An example of the label is the current value of a displacement sensor. The program component 34 includes a block of a label and a block of a device D11. Near a block indicating a label, a block of a device value corresponding to the block of the label is also displayed.

For example, on the graph 40A in FIG. 4, a device value of "1.2345" is shown in the blocks 32A and 32B. That is, on the graph 40A, the device value at the block 31A of the device D10 is "1.2345", and the device value at the block 31B of the device D0 is "1.2345".

Thus, even when a device to be extracted affects or is affected by a plurality of program components, the program creation support apparatus 1 can display the dependency relationships between the devices. On the other hand, when a device value is merely displayed in the vicinity of a specific device included in a ladder program, some dependency relationships can be displayed, but complicated dependency relationships cannot be displayed. In such a case, the user needs to find and display devices having dependency relationships. In the present embodiment, since the program creation support apparatus 1 extracts and displays dependency relationships, the user does not need to extract dependency relationships.

The program creation support apparatus 1 can visualize and display only devices having dependency relationships with a specific device. On the other hand, when a ladder program is merely displayed, devices not having dependency relationships are also displayed, thus it is difficult for the user to easily grasp the dependency relationships between devices. In the present embodiment, since the program creation support apparatus 1 displays only devices having dependency relationships, the user can easily grasp the dependency relationships between devices.

The graph 40A includes a seek bar 60. The program creation support apparatus 1 displays the device values of the devices at time specified by the seek bar 60 on the graph 40A. The length of the seek bar 60 corresponds to a period during which the log data has been collected. A position on the seek bar 60 corresponds to the time the log data at which has been acquired.

When a position on the seek bar 60 is specified by the user, the control unit of the monitor 4 calculates time corresponding to the position on the seek bar 60 and sends the calculated time to the display time setting unit 17. Consequently, the program creation support apparatus 1 displays log data values at the time corresponding to the position on the seek bar 60 on the graph 40A. The seek bar 60 may include a reproduction button 61, a button 62 for returning to the beginning, a button 63 for forwarding to the end, and the like. The program creation support apparatus 1 allows reproduction speed to be adjusted as desired.

Even when there is a plurality of control programs 2, the program creation support apparatus 1 can display the dependency relationships between devices and device values on the graph 40A. When there is a plurality of control programs 2, the dependency relationship extraction unit 15 extracts the dependency relationships between devices across the plurality of control programs 2, based on network setting information that is parameters described in the control programs 2. Network setting information is information indicating cooperation between devices. For example, when the control apparatus executes two control programs 2 on two processors, network setting information includes information indicating the dependency relationships between devices of a first control program 2 and devices of a second control program 2. When there is a plurality of control programs 2, the recording setting information generation unit 16 also generates the recording setting information 3.

Figure 5:
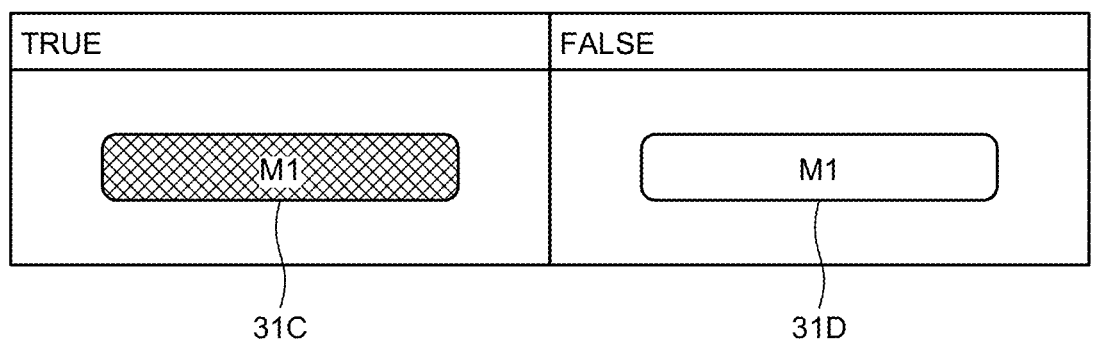
FIG. 5 is a diagram for explaining processing to display device values on blocks representing devices, performed by the program creation support apparatus according to the embodiment.

The generation result output unit 18 may display a device value on a block showing a device. FIG. 5 is a diagram for explaining processing to display a device value on a block showing a device, performed by the program creation support apparatus according to the embodiment.

The generation result output unit 18 changes the display form of blocks 31C and 31D showing a device Ml, according to the value of the device value. For example, the generation result output unit 18 colors the block 31C whose device value is "TRUE" differently from the block 31D whose device value is "FALSE", for display on the monitor 4 FIG. 5 illustrates a case where the block 31C filled with a specific color is "TRUE", and the block 31D not filled with a color is "FALSE". Thus, the generation result output unit 18 expresses the device value with the color-filled states of the blocks 31C and 31D.

Figure 6:
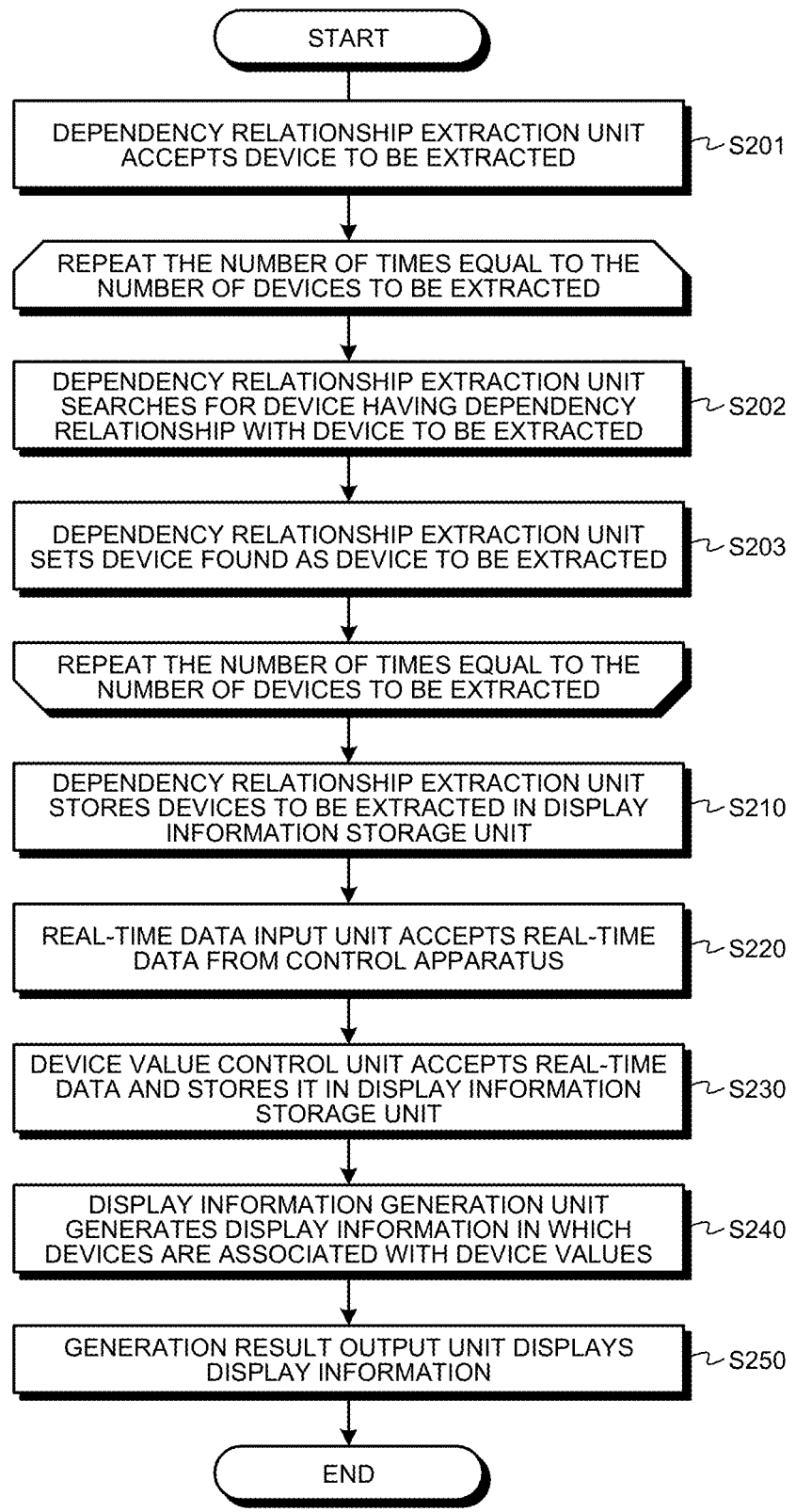
FIG. 6 is a flowchart illustrating a procedure for online monitoring performed by the program creation support apparatus according to the embodiment.

FIG. 6 is a flowchart illustrating a procedure for online monitoring performed by the program creation support apparatus according to the embodiment. The dependency relationship extraction unit 15 of the program creation support apparatus 1 accepts a device to be extracted, which is a target of dependency relationship extraction, from the user (step S201). Here, the device to be extracted is a device corresponding to log data that the user wants to display by online monitoring.

Then, the dependency relationship extraction unit 15 repeats processing in steps S202 and S203 the number of times equal to the number of devices to be extracted, as is the case with the processing in steps S20 and S30 described in FIG. 2.

That is, the dependency relationship extraction unit 15 searches the devices included in the control program 2 for a device having a dependency relationship with the device to be extracted that has already been set (step S202). The dependency relationship extraction unit 15 sets the device found as a device to be extracted (step S203). Thus, the number of devices to be extracted increases.

The dependency relationship extraction unit 15 repeats the processing in steps S202 and S203 on a device to be extracted specified by the user and a device to be extracted set in step S203.

After setting all devices to be extracted, the dependency relationship extraction unit 15 stores the devices to be extracted and the dependency relationships in the display information storage unit 22 (step S210).

The real-time data input unit 12 accepts, from the control apparatus, real-time data that is real-time device values held by the control apparatus (step S220). The real-time data input unit 12 inputs the real-time data to the device value control unit 14.

The device value control unit 14 accepts the real-time data sent from the real-time data input unit 12 and stores the real-time data in the display information storage unit 22 (step S230). The device value control unit 14 may read the real-time data from the real-time data input unit 12.

On the basis of the devices to be extracted, the dependency relationships, and the real-time data in the display information storage unit 22, the display information generation unit 19 generates display information in which the devices are associated with the device values (step S240). The display information includes information that visualizes the dependency relationships between the devices. The generation result output unit 18 displays the display information generated by the display information generation unit 19 on the monitor 4 (step S250).

When receiving an instruction from the user to store real-time data at the time of online monitoring, the program creation support apparatus 1 stores the real-time data. In this case, the real-time data input unit 12 stores real-time data accepted from the control apparatus in the real-time data storage unit 21. Consequently, when receiving an instruction from the user to display real-time data stored in the past, the program creation support apparatus 1 can display the real-time data stored in the past.

Figure 7:
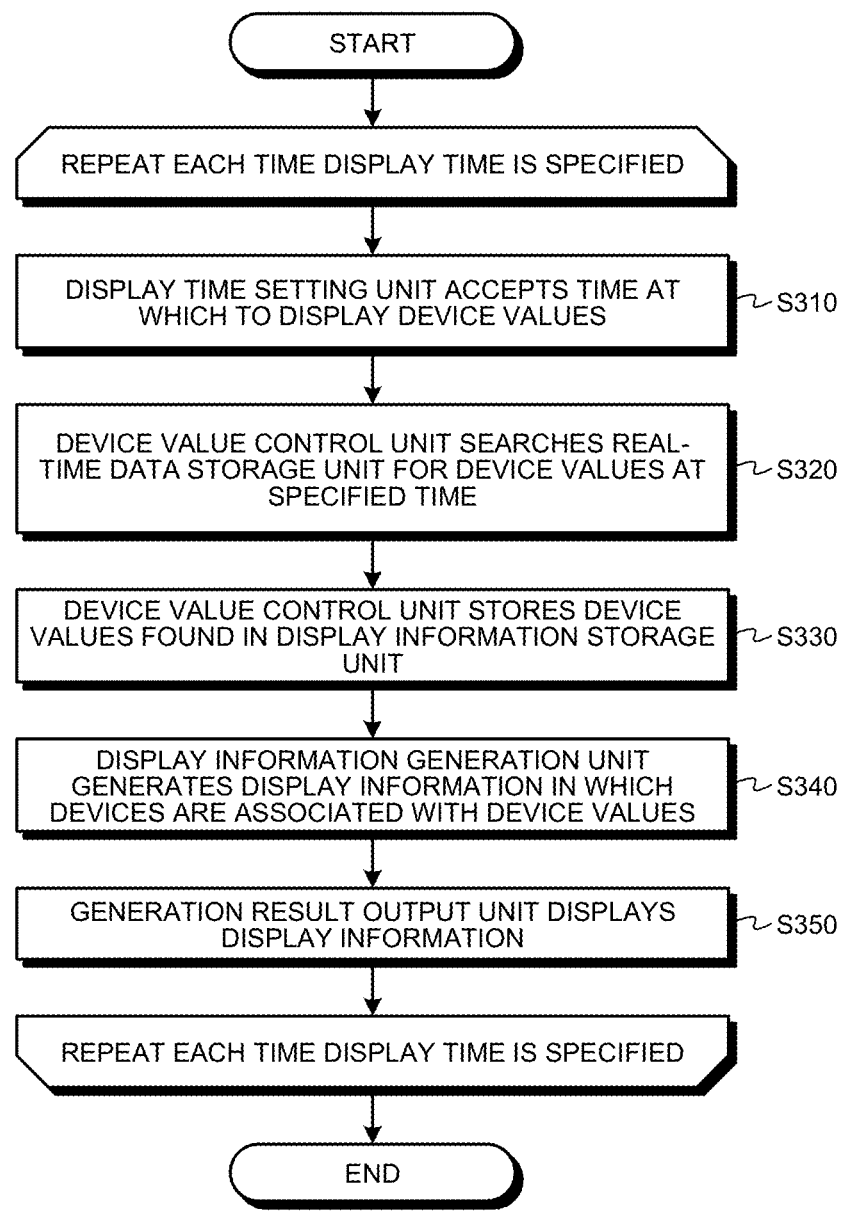
FIG. 7 is a flowchart illustrating a procedure to display real-time data stored in the past, performed by the program creation support apparatus according to the embodiment.

FIG. 7 is a flowchart illustrating a procedure to display real-time data stored in the past, performed by the program creation support apparatus according to the embodiment. The program creation support apparatus 1 repeats the following processing from step S310 to step S350 each time a display time is specified by the user.

The display time setting unit 17 accepts the display time input by the user. The display time here is associated with real-time data stored in the past. Since real-time data stored in the past, that is, past device values indicate different values at different time points, the user specifies a display time when the user wants to display real-time data stored in the past. Thus, the display time setting unit 17 accepts the time device values at which are to be displayed (step S310). The display time setting unit 17 sends the accepted time to the device value control unit 14.

The device value control unit 14 searches the real-time data storage unit 21 for device values at the time specified by the user (step S320). The device value control unit 14 stores the found device values in the display information storage unit 22 (step S330).

On the basis of the devices to be extracted, the dependency relationships, and the device values in the display information storage unit 22, the display information generation unit 19 generates display information in which the devices and the device values at the time specified by the user are associated with each other (step S340). The display information includes information that visualizes the dependency relationships between the devices. The generation result output unit 18 displays the display information generated by the display information generation unit 19 on the monitor 4 (step S350).

The user may want to write a temporary device value to the control apparatus at the time of debugging the control program 2 or the like. In such a case, the program creation support apparatus 1 can write a device value specified by the user to the control apparatus. The program creation support apparatus 1 can accept and display a device value specified by the user.

Figure 8:
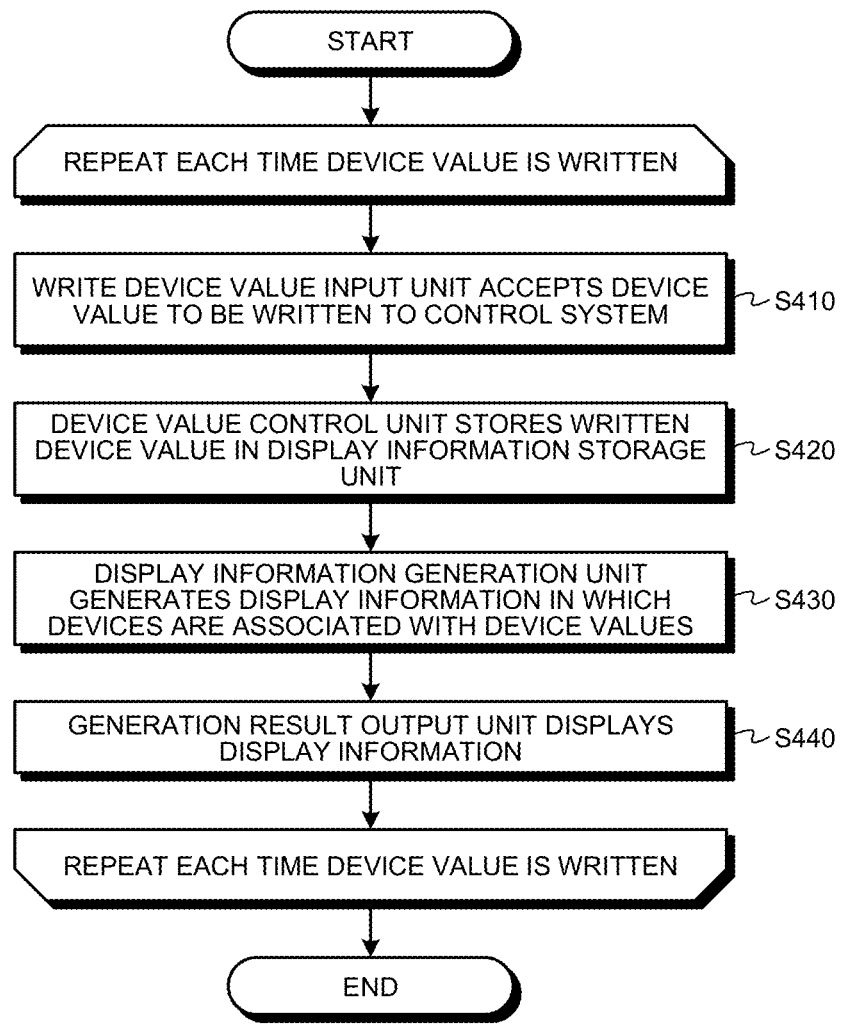
FIG. 8 is a flowchart illustrating a procedure for processing to accept and display a device value specified by a user, performed by the program creation support apparatus according to the embodiment.

FIG. 8 is a flowchart illustrating a procedure for processing to accept and display a device value specified by the user, performed by the program creation support apparatus 1 according to the embodiment. The program creation support apparatus 1 repeats the following processing from step S410 to step S440 each time a device value is written to the program creation support apparatus 1 by the user, during online monitoring.

When the user inputs a device value to be written to the control system to the program creation support apparatus 1, the write device value input unit 13 accepts the device value to be written to the control system (step S410). The write device value input unit 13 sends the accepted device value to the device value control unit 14. The device value may or may not be actually sent to the control apparatus.

The device value control unit 14 stores the device value written to the control system in the display information storage unit 22 (step S420).

On the basis of the devices to be extracted, the dependency relationships, and the device value specified by the user in the display information storage unit 22, the display information generation unit 19 generates display information in which the devices are associated with the device values (step S430). The display information includes information that visualizes the dependency relationships between the devices. The generation result output unit 18 displays the display information generated by the display information generation unit 19 on the monitor 4 (step S440). Thereafter, the device values change as time proceeds.

Next, functions commonly available for the program creation support apparatus 1 during offline monitoring and online monitoring will be described.

The device value control unit 14 of the program creation support apparatus 1 may detect a change in a device value during device value monitoring. In this case, the display information generation unit 19 generates display information using the changed device value, and the generation result output unit 18 displays the display information using the changed device value on the monitor 4. In this case, the generation result output unit 18 generates display information including information indicating the change in the device value. For example, the generation result output unit 18 may highlight the block of the device the device value of which has been changed, in a display mode different from that of other blocks. For example, the generation result output unit 18 may flash the block of the device having the changed device value or may display the block in a color different from a color of other blocks.

The device value control unit 14 may detect a change in a device value between any time points set by the user. Also in this case, the display information generation unit 19 generates display information using the changed device value, and the generation result output unit 18 displays the display information using the changed device value on the monitor 4.

The device value control unit 14 may detect the device value of a device to be extracted that dynamically changes. For example, when an index register (Z, LZ) is used in the control program 2, the number of a device to be extracted is as follows:

"The number of a device to be extracted"="a specified device number"+"a device value in the index register"

Figure 9:
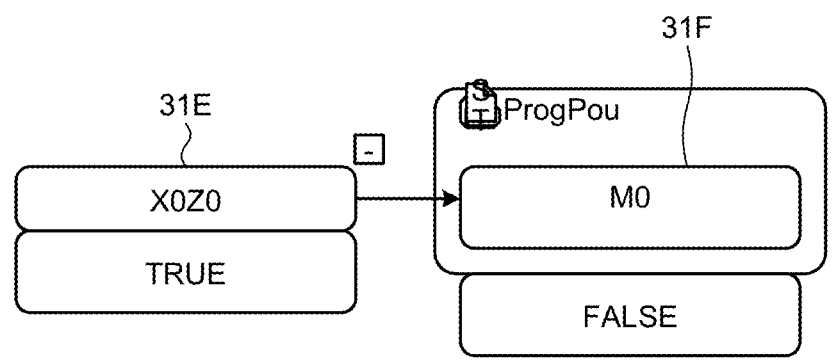
FIG. 9 is a diagram for explaining processing to display the device value of a device to be extracted that dynamically changes, performed by the program creation support apparatus according to the embodiment.

FIG. 9 is a diagram for explaining processing to display the device value of a device to be extracted that dynamically changes, performed by the program creation support apparatus according to the embodiment. FIG. 9 illustrates a block 31E indicating a device of "X0Z0" and a block 31F indicating a device having a dependency relationship with the device of "X0Z0". For example, when "X0Z0" is described in the control program 2, and the device value of "Z0" is "3", the device to be extracted is "X3".

In this case, when the device value of "Z0" is changed during the execution of the control program 2, the device indicated by "X0Z0" is also changed. Even in this case, the device value control unit 14 detects the device value of the device to be extracted.

When the device indicated by "X0Z0" is changed, a device value corresponding to the block 31E displayed near the block 31E is also changed to the device value of the device indicated by "X0Z0". Consequently, the device value of the device having a dependency relationship with the device of "X0Z0" is also changed.

Figure 10:
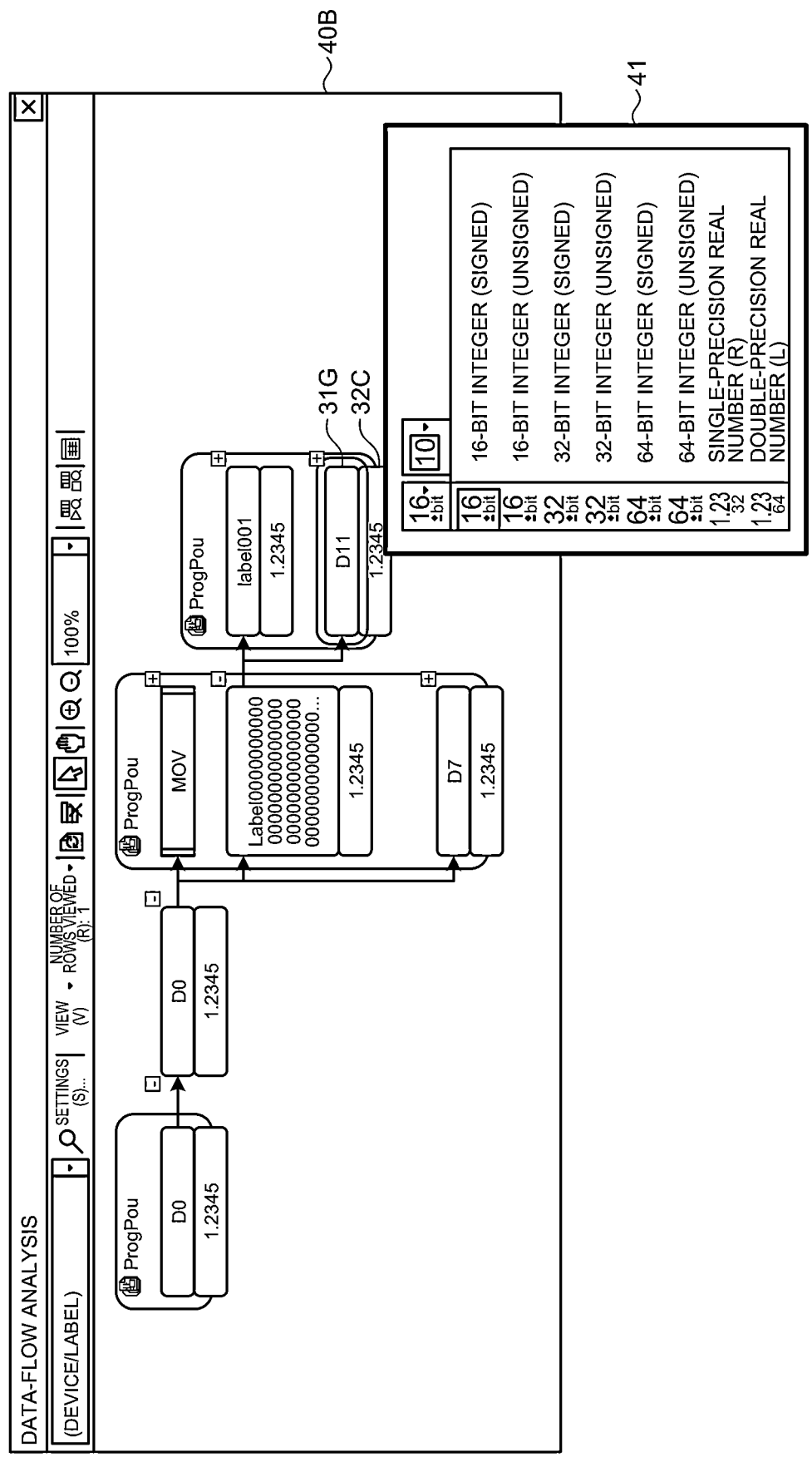
FIG. 10 is a diagram for explaining processing to change the data type and notation of a device value being displayed on the monitor, performed by the program creation support apparatus according to the embodiment.

The generation result output unit 18 may change the data type and notation of a device value being displayed on the monitor 4, according to an instruction from the user. FIG. 10 is a diagram for explaining processing to change the data type and notation of a device value being displayed on the monitor, performed by the program creation support apparatus according to the embodiment.

A graph 40B illustrated in FIG. 10 includes a block 31G indicating a device D11 and a block 32C indicating a device value corresponding to the device D11 of the block 31G. When the user specifies the device D11 of the block 31G on the graph 40B illustrated in FIG. 10, the generation result output unit 18 highlights the block 31G as compared with other blocks. Further, when the user specifies the device D11 of the block 31G, the generation result output unit 18 displays display candidates 41 for the display mode of the device value displayed on the block 32C on the graph 40B.

The display candidates 41 are data type candidates and notation candidates. The display candidates 41 include, for example, data type candidates such as a 16-bit integer (signed) and a 64-bit integer (unsigned). The display candidates 41 further include notation candidates of data type such as a binary number and a decimal number.

When the user specifies a certain data type and a certain notation from the display candidates 41, the generation result output unit 18 displays the device value currently displayed, in the specified data type and notation on the graph 40B. That is, the generation result output unit 18 changes the display of the device value to the data type and notation specified by the user. The user may specify one of the data type and the notation.

Further, when the user specifies an instance of a function block (FB), the generation result output unit 18 may display the device value of a member of the specified FB. A large number of FB can be pasted on program components in the control program 2. An FB pasted on a program component is an instance. A member is a label that can be used only in an FB.

Figure 11:
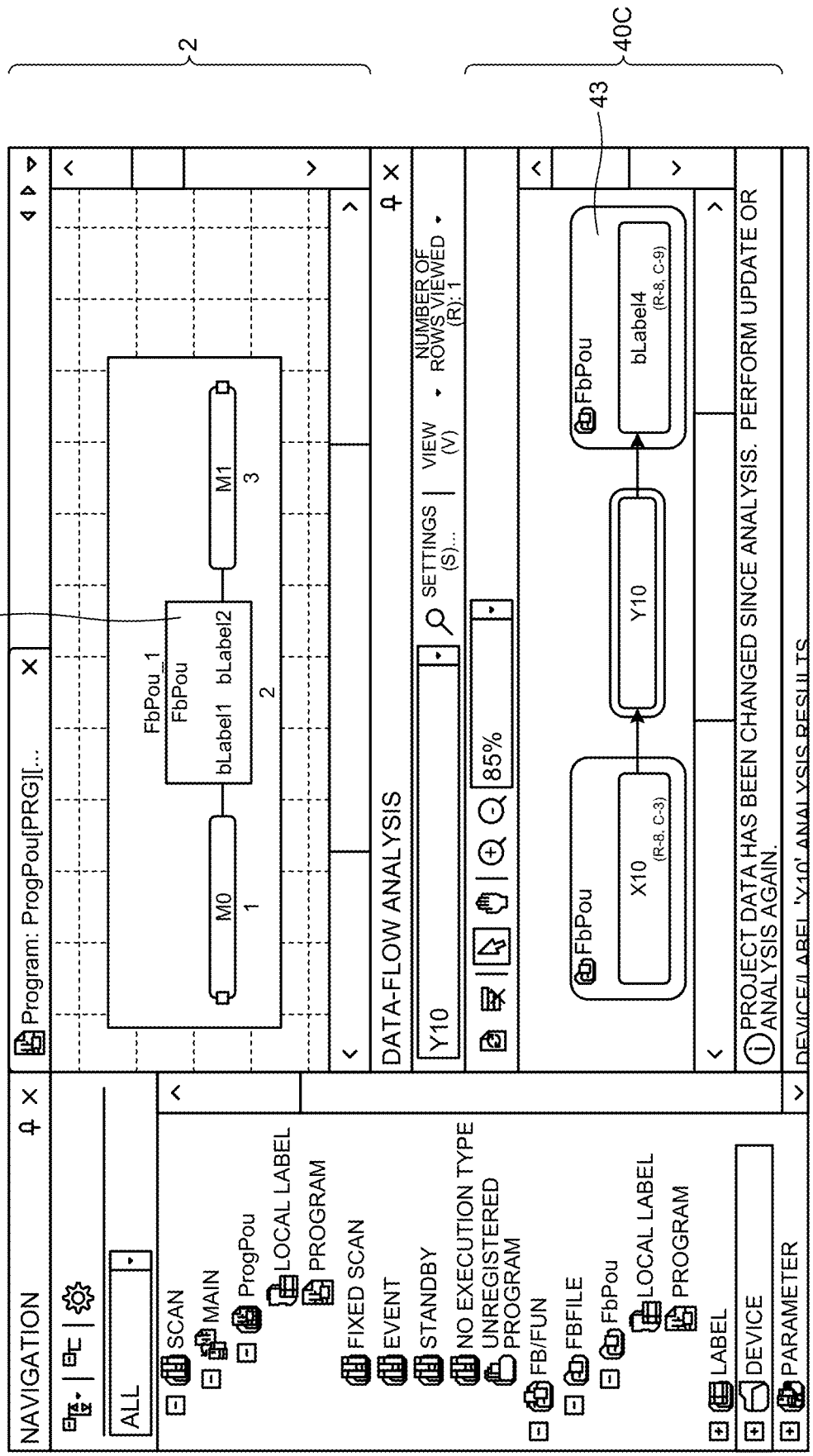
FIG. 11 is a diagram for explaining processing to display the device value of a member of a function block (FB) specified by the user, performed by the program creation support apparatus according to the embodiment.

FIG. 11 is a diagram for explaining processing to display the device value of a member of an FB specified by the user, performed by the program creation support apparatus according to the embodiment. As illustrated in FIG. 11, the monitor 4 displays the control program 2 in a window for displaying program, and displays a graph 40C in a window for data analysis.

The control program 2 includes various instances. FIG. 11 illustrates a case where an instance 42 is included in the control program 2. For the instances included in the control program 2, each instance (each label) has a different device value of a member. Thus, the user specifies an instance whose device value is to be displayed on the graph 40C displayed in the data analysis window. In this case, when a certain FB is specified by the user with a right click or the like on the data analysis window, the generation result output unit 18 displays instance candidates.

When the monitor 4 displays the graph 40C in the data analysis window, and an instance corresponding to the FB is specified by the user, the generation result output unit 18 displays the device value of a member 43 corresponding to the specified FB.

The device value control unit 14 may store information on the position of a device in the control program 2 for which a storage request has been made by the user. In this case, the user requests the program creation support apparatus 1 to store an arbitrary device on the graph 40C that visualizes the dependency relationships between devices. The device value control unit 14 stores, in the display information storage unit 22, information on the position of the device in the control program 2 for which the storage request has been made by the user on the graph 40C.

When accepting, from the user, a request to display a device whose position information is stored in the display information storage unit 22, the device value control unit 14 reads the position information stored in the display information storage unit 22, that is, the information on the position of the device in the control program 2 for which the display request has been made. On the basis of the read position information, the device value control unit 14 displays, on the monitor 4, the position of the device in the control program 2 for which the display request has been made.

Figure 12:
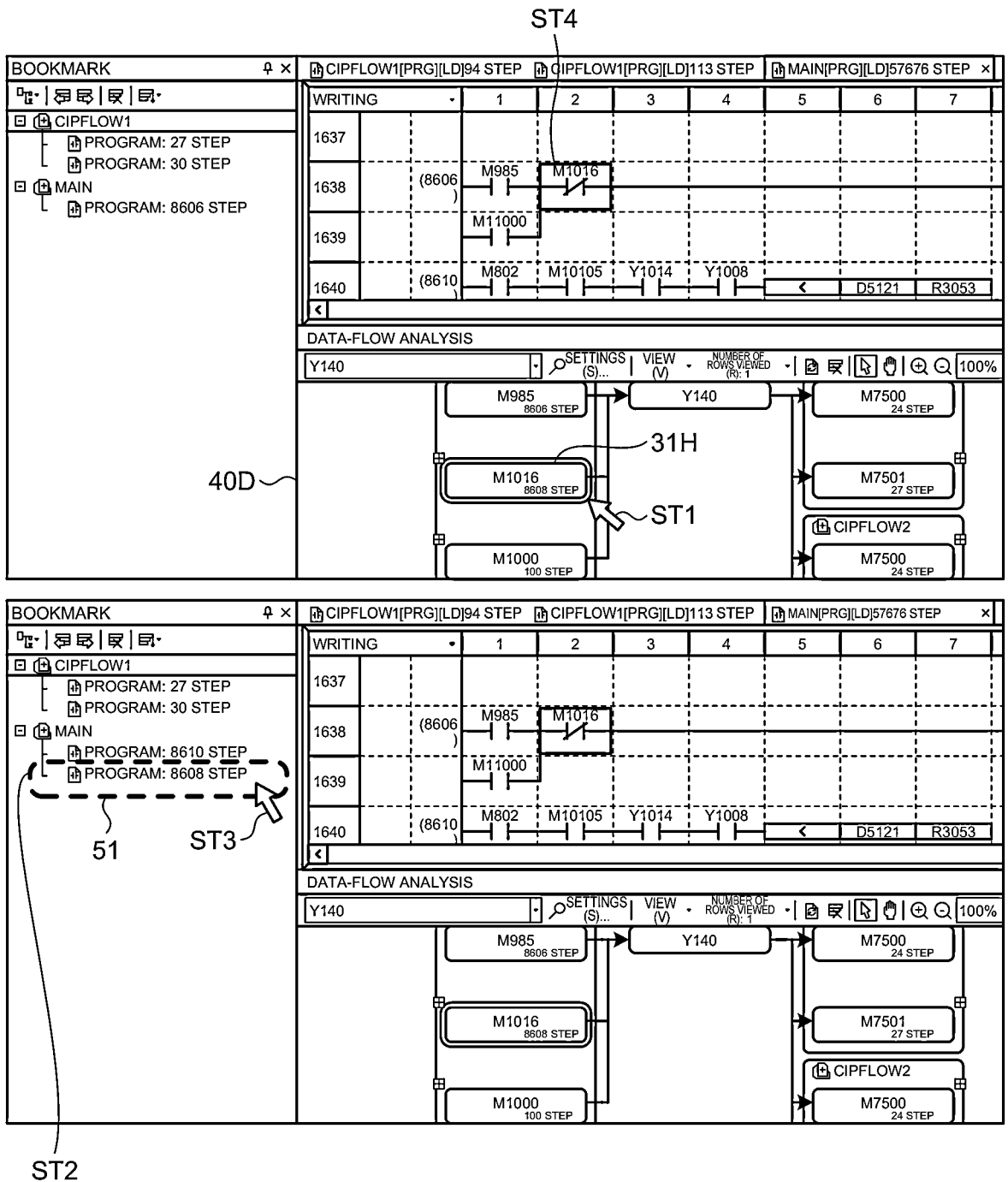
FIG. 12 is a diagram for explaining processing to store information on the position of a device in a control program on which a storage request has been made, and display the position of a device in the control program on which a display request has been made, performed by the program creation support apparatus according to the embodiment.

FIG. 12 is a diagram for explaining processing to store information on the position of a device in the control program for which a storage request has been made, and display the position of a device in the control program for which a display request has been made, performed by the program creation support apparatus according to the embodiment.

A graph 40D illustrated in FIG. 12 includes a block 31H indicating a device M1016. When the block 31H is specified by the user on the graph 40D, and a request to store information on the position of the block 31H in the control program 2 is accepted from the user (ST1), the device value control unit 14 stores the position information for which the storage request has been made (here, a 8608 step) in the display information storage unit 22.

When the monitor 4 displays the graph 40D in a data analysis window, the device value control unit 14 accepts a request to store position information at an arbitrary timing. In this case, for example, when the block 31H is specified by the user with a right click, and a button to store block position information is clicked, the device value control unit 14 stores information on the position of the block 31H in the control program 2 in the display information storage unit 22.

The generation result output unit 18 displays identification information 51 for identifying the position information in a bookmark window of the graph 40D (ST2). When the identification information 51 of the position information is specified by the user on the graph 40D (ST3), the generation result output unit 18 reads the position information stored in the display information storage unit 22. Then, the generation result output unit 18 highlights the position corresponding to the position information of the identification information 51 of the control program 2 (ST4). For example, when a button indicating the identification information 51 is double-clicked by the user on the graph 40D, the generation result output unit 18 jumps the display area of the control program 2 to the position corresponding to the position information of the identification information 51. For example, the generation result output unit 18 highlights a portion corresponding to the position information on the control program 2. FIG. 12 illustrates a case where the device M1016 corresponding to the block 31H for which the display request has been made is highlighted.

Furthermore, the device value control unit 14 may store any display state at any time specified by the user in the display information storage unit 22. In this case, when a request to display a display state at specific time is accepted from the user at any timing, the generation result output unit 18 displays the display state at the time corresponding to the display request on the monitor 4.

Figure 13:
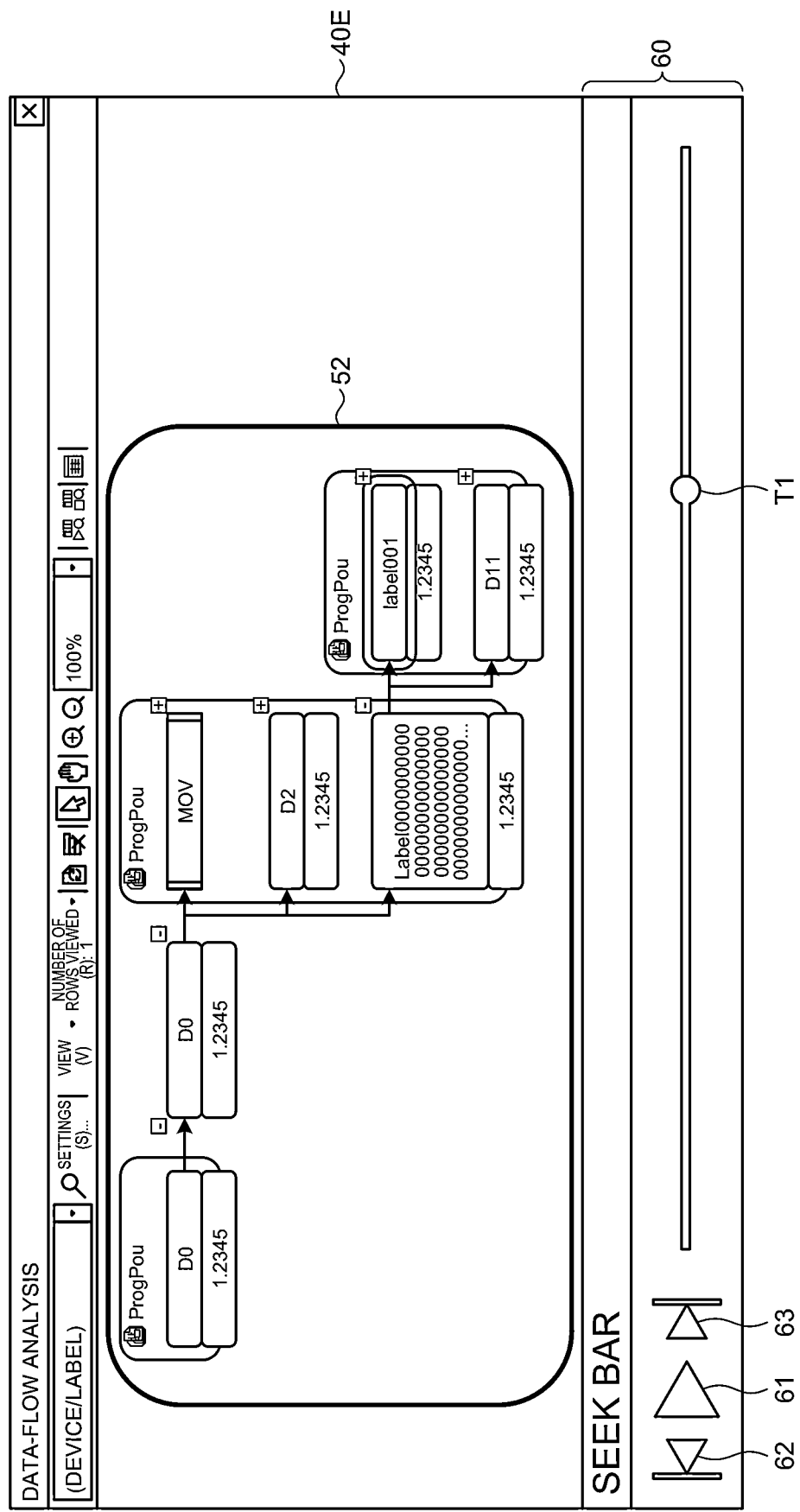
FIG. 13 is a diagram for explaining processing to store a display state at a point of time specified by the user, performed by the program creation support apparatus according to the embodiment.

FIG. 13 is a diagram for explaining processing to store a display state at a point of time specified by the user, performed by the program creation support apparatus according to the embodiment. A display state 52 illustrated in FIG. 13 is a display state of a graph 40E at a time T1 specified by the user. The display state 52 includes device values at the time T1 displayed on the graph 40E.

The device value control unit 14 stores the display state 52 at the time T1 specified by the user in the display information storage unit 22. When a request to display the display state 52 at the time T1 is accepted from the user, the generation result output unit 18 displays the display state 52 on the monitor 4.

Figure 14:
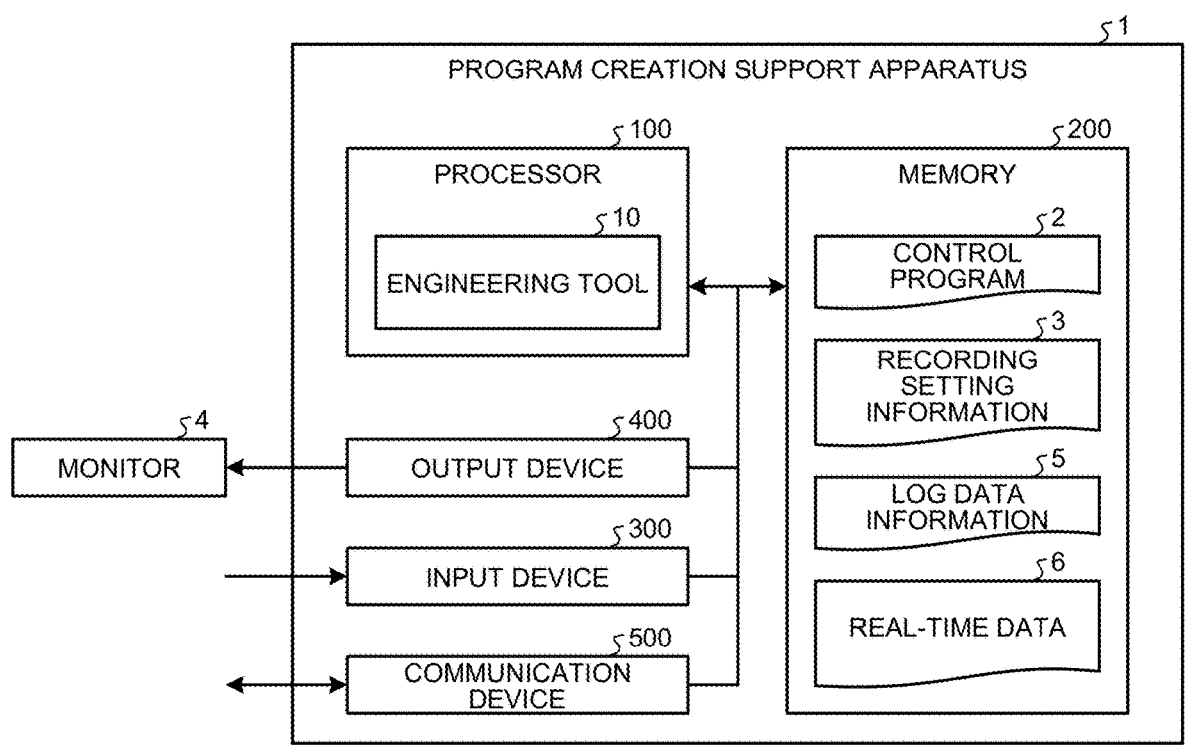
FIG. 14 is a diagram illustrating an example of a hardware configuration that implements the program creation support apparatus according to the embodiment.

FIG. 14 is a diagram illustrating an example of a hardware configuration that implements the program creation support apparatus according to the embodiment. The program creation support apparatus 1 can be implemented by an input device 300, a processor 100, memory 200, an output device 400, and a communication device 500. An example of the processor 100 is a central processing unit (CPU, also called a processing unit, an arithmetic unit, a microprocessor, a microcomputer, or a digital signal processor (DSP)) or a system large-scale integration (LSI). Examples of the memory 200 are random access memory (RAM) and read-only memory (ROM).

The program creation support apparatus 1 is implemented by the processor 100 reading and executing a computer-executable program creation support program for performing the operation of the program creation support apparatus 1 stored in the memory 200. The program creation support program, which is a program to perform the operation of the program creation support apparatus 1, that is, an engineering tool 10 can be said to cause a computer to perform a procedure or a method in the program creation support apparatus 1.

The program creation support program executed by the program creation support apparatus 1 has a module configuration including the device value control unit 14, the dependency relationship extraction unit 15, the recording setting information generation unit 16, the display time setting unit 17, the generation result output unit 18, and the display information generation unit 19, which are loaded into main memory and generated in the main memory.

The input device 300 accepts the control program 2, log data information 5, real-time data 6, instructions from the user, and the like, and sends them to the processor 100. The memory 200 stores the control program 2, the recording setting information 3 generated by the engineering tool 10, the log data information 5, the real-time data 6, and the like. Although not illustrated in FIG. 14, the memory 200 stores devices to be extracted, dependency relationships, and the like. The memory 200 is used as temporary memory when the processor 100 executes various types of processing. The memory 200 is the display information storage unit 22, the real-time data storage unit 21, or the like.

The output device 400 outputs display information generated by the generation result output unit 18 to the monitor 4. The communication device 500 transmits, to the control apparatus, the recording setting information 3 output from the communication unit 20.

The program creation support program may be stored on a computer-readable storage medium in an installable-format or executable-format file and provided as a computer program product. The program creation support program may be provided to the program creation support apparatus 1 via a network such as the Internet. The functions of the program creation support apparatus 1 may be partly implemented by dedicated hardware such as a dedicated circuit and partly implemented by software or firmware.

As described above, in the embodiment, the dependency relationship extraction unit 15 extracts the dependency relationships between devices described in the control program 2. The log data input unit 11 acquires, from the control apparatus, the log data information 5 about targets of collection collected by the control apparatus based on the recording setting information 3. The display information generation unit 19 generates display information that visualizes the dependency relationships between devices and visualizes device values associated with the devices, based on the dependency relationships and the log data information 5. The generation result output unit 18 displays the display information on the monitor 4. Thus, the engineering tool 10 can provide information that visualizes the dependency relationships between devices and log data on device values.

The recording setting information generation unit 16 generates the recording setting information 3 that describes a condition for collecting the log data information 5, based on devices that become targets of collection of the log data information 5 and extracted dependency relationships. This eliminates the need for the user to generate the recording setting information 3, and thus allows a reduction in work to generate the recording setting information 3.

The real-time data storage unit 21 stores the real-time data 6. The display information generation unit 19 generates display information that visualizes the correspondence relationships between devices and the real-time data 6 and dependency relationships, using the real-time data 6. Then, the generation result output unit 18 displays the display information on the monitor 4. Thus, the engineering tool 10 can display the real-time data 6 at any timing.

The generation result output unit 18 displays display information at time specified by the user. This allows the user to check display information at a desired time.

The configuration described in the above embodiment illustrates an example, and can be combined with another known art, and can be partly omitted or changed without departing from the gist.

REFERENCE SIGNS LIST 1 program creation support apparatus; 2 control program; 3 recording setting information; 4 monitor; 5 log data information; 6 real-time data; 10 engineering tool; 11 log data input unit; 12 real-time data input unit; 13 write device value input unit; 14 device value control unit; 15 dependency relationship extraction unit; 16 recording setting information generation unit; 17 display time setting unit; 18 generation result output unit; 19 display information generation unit; 20 communication unit; 21 real-time data storage unit; 22 display information storage unit; 31A to 31H, 32A to 32C block; 33, 34 program component; 40A to 40E graph; 41 display candidate; 42 instance; 43 member; 51 identification information; 52 display state; 60 seek bar; 100 processor; 200 memory; 300 input device; 400 output device; 500 communication device.

The invention claimed is:

1. A non-transitory computer-readable storage medium to store a program creation support program to display devices that are areas to store data indicating an operating status of a control system, and associated device values that are values held by devices, based on a control program executed by a control apparatus of the control system, the control system including a control target apparatus and the control apparatus that controls the control target apparatus, the program creation support program causing a computer to perform:

extracting dependency relationships between the devices described in the control program, wherein the dependency relationships between the devices are relationships between the devices in which one device affects another device;

acquiring, as log data information that is information on log data on the device values associated with the devices, log data collected by the control apparatus during operation of the control system, based on recording setting information describing a condition for collecting the log data information;

generating first display information that visualizes the dependency relationships between the devices and visualizes the device values associated with the devices, based on the dependency relationships between the devices and the log data information; and displaying the first display information, wherein:

the devices dynamically change during the operation of the control system, and in the first display information generation, the first display information corresponding to one or more of the devices that have dynamically changed is generated.

2. The non-transitory computer-readable storage medium according to claim 1, wherein the program creation support program further causing the computer to perform:

generating the recording setting information, based on the devices that are targets of collection of the log data information and the dependency relationships between the devices.

3. The non-transitory computer-readable storage medium according to claim 1, wherein the program creation support program further causing the computer to perform:

acquiring, from the control apparatus, real-time data that includes real-time device values during the operation of the control system;

generating second display information that visualizes correspondence relationships between the devices and the real-time data and the dependency relationships between the devices, based on the dependency relationships between the devices and the real-time data; and displaying the second display information.

4. The non-transitory computer-readable storage medium according to claim 3, wherein the program creation support program further causing the computer to perform:
store the real-time data, wherein:
in the second display information generation, the second display information is generated using the real-time data stored.

5. The non-transitory computer-readable storage medium according to claim 3, wherein:
in the second display information generation, the second display information is generated using a device value input by a user during the operation of the control system.

6. The non-transitory computer-readable storage medium according to claim 1, wherein:
in the first display information displaying, the first display information at a time specified by a user is displayed.

7. The non-transitory computer-readable storage medium according to claim 1, wherein:
in the first display information generation, when a change in one or more of the device values associated with the devices is detected during monitoring of the device values associated with the devices, the first display information including information indicating the change in one or more of the device values associated with the devices is generated.

8. The non-transitory computer-readable storage medium according to claim 1, wherein the program creation support program further causing the computer to perform:
storing position information indicating a position in the control program of a device selected from the devices by a user, wherein:
when the position information is specified by the user, a display area of the control program is jumped to the position in the control program corresponding to the user-specified position information.

9. The non-transitory computer-readable storage medium according to claim 1, wherein the program creation support program further causing the computer to perform:
storing a display state of the first display information being displayed when a storage instruction is given from a user; and
displaying the first display information in the display state when a display instruction is given from the user.

10. The non-transitory computer-readable storage medium according to claim 1, wherein:
in the first display information displaying, the device values associated with the devices in the first display information are displayed in a data type and a notation specified by a user.

11. The non-transitory computer-readable storage medium according to claim 1, wherein:
in the first display information displaying, when an instance corresponding to a function block included in the control program is specified by a user, a device value of a member corresponding to the function block is displayed.

12. The non-transitory computer-readable storage medium according to claim 1, wherein:
the control program is one of a plurality of control programs; and
in the dependency relationship extraction, the dependency relationships between the devices are extracted, based on information indicating cooperation between the devices described in the plurality of control programs.

13. A program creation support apparatus to display devices that are areas to store data indicating an operating status of a control system, and associated device values that are values held by devices, based on a control program executed by a control apparatus of the control system, the control system including a control target apparatus and the control apparatus that controls the control target apparatus, the program creation support apparatus comprising:
a processor; and
a memory to store a program which, when executed by the processor, performs processes of:
extracting dependency relationships between the devices described in the control program, wherein the dependency relationships between the devices are relationships between the devices in which one device affects another device;
acquiring, as log data information that is information on log data on the device values associated with the devices, log data collected by the control apparatus during operation of the control system, based on recording setting information describing a condition for collecting the log data information;
generating display information that visualizes the dependency relationships between the devices and visualizes the device values associated with the devices, based on the dependency relationships between the devices and the log data information; and
displaying the display information, wherein:
the devices dynamically change during the operation of the control system, and in the display information generation, the display information corresponding to one or more of the devices that have dynamically changed is generated.

14. A program creation support method to display devices that are areas to store data indicating an operating status of a control system, and associated device values that are values held by devices, based on a control program executed by a control apparatus of the control system, the control system including a control target apparatus and the control apparatus that controls the control target apparatus, the program creation support method comprising:
extracting dependency relationships between the devices described in the control program, wherein the dependency relationships between the devices are relationships between the devices in which one device affects another device;
acquiring, as log data information that is information on log data on the device values associated with the devices, log data collected by the control apparatus during operation of the control system, based on recording setting information describing a condition for collecting the log data information;
generating display information that visualizes the dependency relationships between the devices and visualizes the device values associated with the devices, based on the dependency relationships between the devices and the log data information; and
displaying the display information, wherein:
the devices dynamically change during the operation of the control system, and in the display information generation, the display information corresponding to one or more of the devices that have dynamically changed is generated.

* * * * *